United States Patent

[11] 3,596,718

| [72] | Inventors | Charles Dennis Fish;<br>Ronald B. Schildt, both of Quincy, Ill. |
|---|---|---|
| [21] | Appl. No. | 838,397 |
| [22] | Filed | July 2, 1969 |
| [45] | Patented | Aug. 3, 1971 |
| [73] | Assignee | Gardner-Denver Company<br>Quincy, Ill. |

[54] TORQUE CONTROL SYSTEM
9 Claims, 2 Drawing Figs.

[52] U.S. Cl. .................................................. 173/12,
73/136, 91/59
[51] Int. Cl. ................................................... B25b 23/14
[50] Field of Search .......................................... 173/12, 1;
91/59; 73/136, 137, 139

[56] References Cited
UNITED STATES PATENTS
2,867,117  1/1959  Ernst ............................ 73/139
3,276,250  10/1966  German ........................ 73/136

Primary Examiner—Ernest R. Purser
Attorney—Michael E. Martin

ABSTRACT: A control system for a torque producing power tool such as a nutsetter, screwdriver, or the like. The control system includes an electromechanical transducer which operates on the principle of a linear variable differential transformer. The transducer, in part, comprises the final drive spindle of the tool and is thereby in close proximity to the fastener being tightened. An electrical signal is produced by the transducer which is proportional to the torsional motive force applied to the drive spindle. The control system includes switching devices operable in response to a predetermined signal from the transducer to shut off the power supply to the tool and actuate various system condition indicators.

inventors
Charles Dennis Fish
Ronald B. Schildt
by Michael E. Martin
agent

TORQUE CONTROL SYSTEM

BACKGROUND OF THE INVENTION

This invention relates to power tools used for tightening threaded fasteners. Such tools are generally characterized by a pressure fluid or electric motor suitably connected to a rotary drive spindle to which is attached a wrench socket or screwdriver bit. Single and multiple spindle tools operating with compressed air as the motive fluid are extensively used in assembly operations in the automobile manufacturing industry. Increasingly stringent requirements for structural integrity and quality assurance in the manufacture of automotive vehicles and other types of machinery have made necessary the accurate control over the torque applied to threaded fasteners joining the machine elements. Moreover, it is desirable that evidence of the satisfactory completion of a fastener tightening tool operating cycle be indicated to the tool operator and also be permanently recorded for subsequent audit.

Various devices are known in the art of fastener tightening power tools which are responsive, directly or indirectly, to a predetermined torque output thereof to shut off the power supply to the tool or to disengage the tool motor from the drive spindle. Known devices include torque responsive clutches which disengage the tool motor from the drive spindle when a separating force is applied between the driving and driven clutch elements which corresponds to a predetermined torsional motive force produced by the tool. Other devices known in the art of fluid-operated tools are operable to sense the motive fluid supply pressure which in conventional tools is somewhat proportional to the torque output of the tool motor. These pressure-sensing devices operate in response to a predetermined change in fluid supply pressure at the motor inlet to interrupt the fluid supply to the motor. Further known devices, often used in multiple tool arrangements, are characterized by pivotal mounting of the tool for limited rotational movement in reaction to the torque applied by the tool whereby the tool movement is used to operate a control device.

The shortcomings of prior art devices are largely attributable to the fact that the accuracy and repeatability of clutches and motive fluid pressure-sensing devices do not meet current requirements for tools used in critical fastener tightening applications. Moreover, known devices of the clutch and pressure-sensing type do not sense directly the torque being transmitted by the driving element of the tool which engages the fastener. Accordingly, such devices are subject to inaccurate performance and indication, and in case of a failure in the tool mechanism give a completely false indication that a fastener has been tightened. A disadvantage of the pivotally mounted tool device is that projections and biasing means between the tool proper and a mounting frame, necessary for controlling the pivotal movement, preclude the close spacing of multiple spindle units. Furthermore, known torque control devices do not provide a suitable indication or record of the failure of a tool to perform within a predetermined tolerance range.

SUMMARY OF THE INVENTION

The present invention provides a control system for a torque producing power tool which is operable to sense directly the torque transmitted by a transducer element in the drive train of the tool proper between the tool motor and a workpiece. More particularly, the present invention provides a torque control system which includes a torque sensing element comprising a tool drive member which is engaged with the workpiece being operated on by the torque producing tool.

In accordance with the preferred embodiment of the present invention, there is provided a fluid-operated power tool for tightening threaded fasteners wherein the tool drive spindle includes an electromechanical transducer. An electromotive force proportional to the torsional force applied by the drive spindle to a fastener is produced by the transducer and its associated control system; and, such electromotive force effects shutoff of the motive fluid supply to the tool in response to a predetermined torque developed by the tool.

The present invention further provides a torque control system for a power tool which is operable to indicate and record with precision a satisfactory or unsatisfactory completion of a tool operating cycle.

The control system of the present invention provides more accurate and reliable control of the torque produced by power tools used for tightening threaded fasteners than heretofore known control systems. Moreover, the present invention provides a power tool having a torque sensing device which comprises the final driving element of the tool with little increase in the bulk or weight of the tool proper and without reducing the reliability of the overall tool system. Accordingly, the present invention is particularly advantageously used in multiple fastener torquing tool units as well as single spindle tools.

DESCRIPTION OF THE PREFERRED EMBODIMENT

Figure 1:
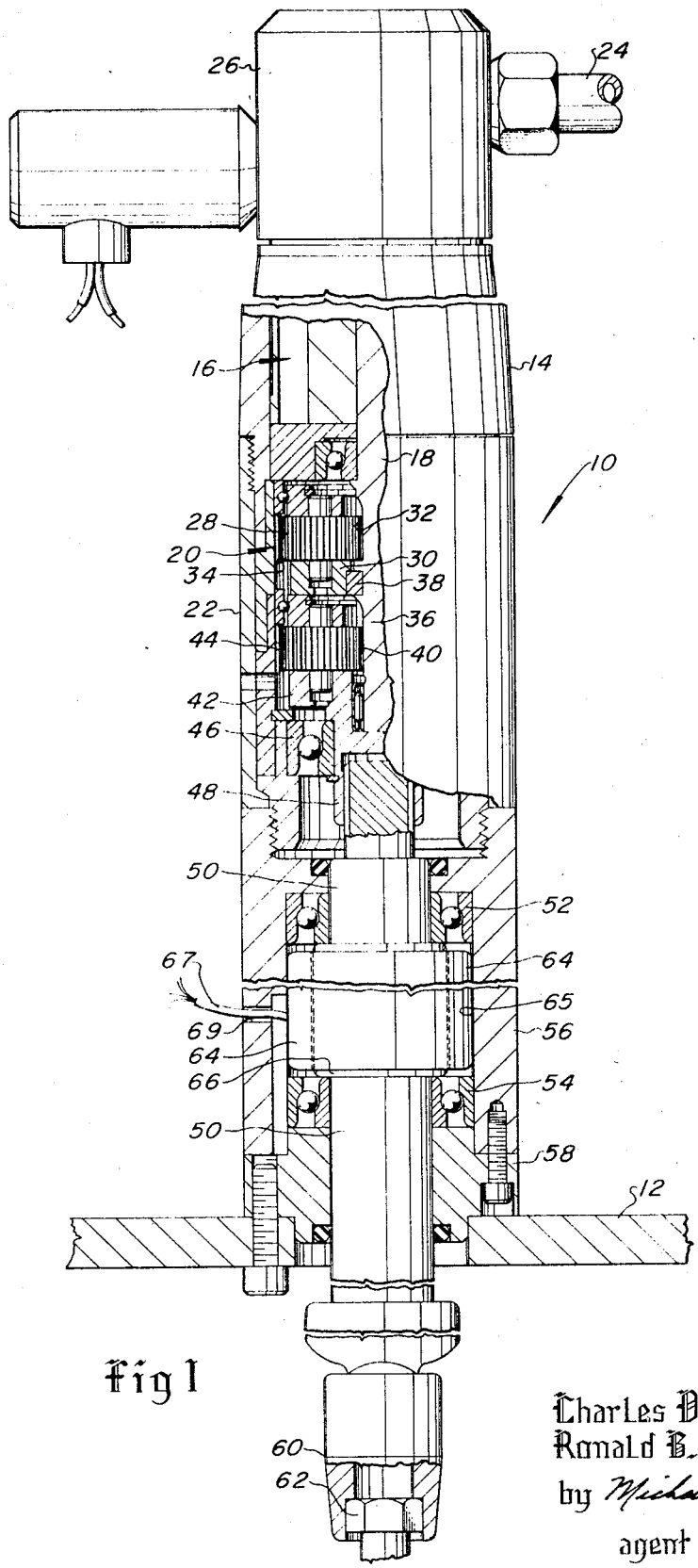
FIG. 1 is a longitudinal view partly in section of a fastener tightening power tool embodying a torque transducer in accordance with the present invention.

Referring to FIG. 1 a conventional torque producing power tool is shown partially sectioned and generally designated by the numeral 10. The tool 10 is of a type well known in the art of power tools for tightening threaded fasteners, commonly referred to as a nutsetter. The tool 10 is operable to be powered by compressed air although the present invention contemplates that tools deriving motive energy from an electrical or other pressure fluid source may be used. The exemplary tool illustrated in FIG. 1 is adapted to be mounted on a frame 12 whereby a plurality of tools may be similarly mounted forming a multiple arrangement as in common practice in the application of fastener tightening apparatus. An example of a multiple nutsetter is disclosed in U.S. Pat. No. 2,742,807 to W. P. Ferm et al.

The tool 10 comprises a housing 14 in which is disposed an expansible chamber motor 16 of the well-known rotary vane type. The motor 16 includes a rotor member 18 which is rotatably engaged with drive means including a gear transmission 20 disposed in an intermediate tool housing portion 22. The motor 16 is operable to receive compressed air from a supply, not shown, by way of a supply line 24 through a solenoid-operated shutoff valve 26 mounted on the housing 14. The valve 26 is operable to interrupt the supply of motive air to the motor in response to the operation of a control system shown schematically in FIG. 2 and described in some detail herein.

The gear transmission 20 is operable to reduce the rotative speed of the motor to a suitable speed for driving threaded fasteners to a predetermined degree of tightness in making up mechanical joints. The gear transmission includes a first planetary stage comprising plant gears 28 (one shown) rotatably mounted on a planet carrier 30 and enmeshed with a fixed annular gear 34 and a pinion 32 formed integral the motor rotor 18. The planet carrier 3 is nonrotatably secured relative to an intermediate shaft member 36 by means of the key 38. The intermediate shaft 36 also comprises a pinion rotatably enmeshed with a second stage planetary gear unit comprising planet gears 40 (one shown) which are rotatably mounted on a carrier 42. The planet gears 40 are also enmeshed with a fixed annular gear 44. The planet carrier 42 is rotatably mounted on a bearing 46 and includes a reduced diameter portion 48 formed with internal splines which are engaged with complementary splines formed on a final drive member 50. The drive member 50 is rotatably mounted on bearings 52 and 54 in the housing portion 56 and extends through an end cap 58. A wrench socket 60, shown engaged with a workpiece comprising the head of a threaded fastener element 62, is nonrotatably mounted on the end of the drive member 50. For practical purposes in providing interchangeability the socket 60 is removably mounted on the member 50. However, the drive member 50 is considered to be engaged with the fastener 62 since no relative rotary movement occurs between the member 50 and the socket. The socket may, of course, be formed integral with the member 50.

The drive member 50 is operable to transmit torque applied thereto by the motor 16 to the fastener 62 and is subject to the same torsional motive force that is required to tighten the fastener. Since the member 50 is the final drive member of the tool drive train it is desirable to measure the magnitude of the torque transmitted by said member so that a direct measurement of a predetermined degree of tightness of a fastener may be obtained or, accordingly, a predetermined precise amount of torque may be imposed on the fastener. To this end the member 50 comprises signal producing means in the form of an electromechanical transducer which is operable to produce an electrical signal proportional to a mechanical displacement of the member caused by a torsional motive force imposed on the member.

Figure 2:
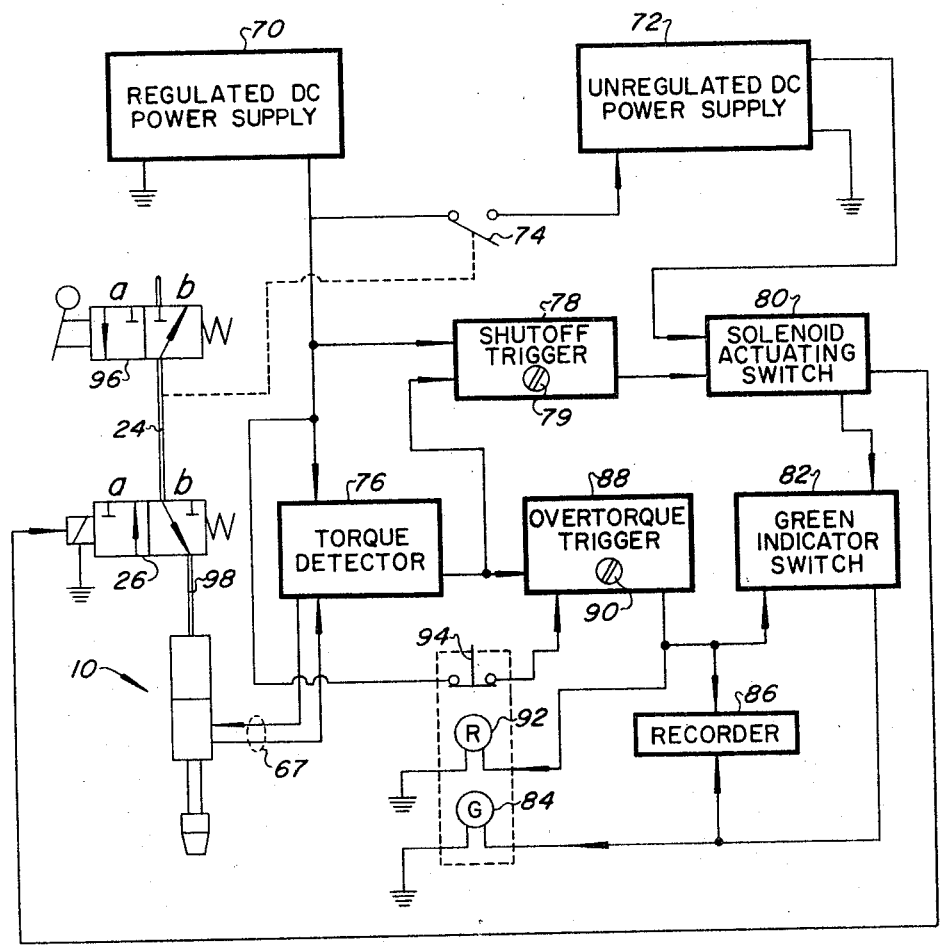
FIG. 2 is a schematic of the torque control system of the present invention.

The particular transducer used in the embodiment disclosed in FIGS. 1 and 2 includes, in addition to the drive member 50, a stationary member 64 which is mounted in the bore 65 of the housing portion 56. The transducer operates on the principle of what is known in the art of electromechanical devices as a linear variable differential transformer. The member 64 includes a primary winding or coil and two secondary windings of electrical conductor which are spaced in close proximity to each other. In response to an alternating current electromotive force being imposed on the primary winding, from a source not shown in FIG. 1, a magnetic field is generated which passes through the secondary windings and induces an electromotive force therein in accordance with well-known physical laws of electricity and magnetism. The magnetic field also passes through and is influenced by the presence of the drive member 50 and in particular by the enlarged diameter portion 66. The mechanical construction of the portion 66 of the drive member is such that in response to a torque applied to the drive member the magnetic field passing therethrough is modified in relation to the amount of torque and consequently the induced electromotive forces in the secondary windings are also modified. Such modification generates a measurable electrical signal which is linearly proportional to the torque magnitude applied to the drive member 50. The electrical conductors 67 providing the input and output electrical signals to the member 64 are shown passing through an opening 69 in the housing portion 56.

The detailed construction and operating characteristics of transducers per se of the type formed by the members 50 and 64 are known to those skilled in the art of electromechanical devices. The particular transducer used in the embodiment of FIGS. 1 and 2 is commercially available from Ametek Inc., Instruments and Controls, Feasterville, Pa. U.S.A.

The electromechanical transducer of the type discussed and available from the above-mentioned source is particularly suitable due to the fact that no mechanical contact is required between the drive member 50 and a signal receiving system as in certain devices known in the art. Accordingly, friction and wear between the drive member and a signal receiving pickup device are avoided. Moreover, the accurate production of an electrical signal linearly proportional to a mechanical displacement makes the differential transformer transducer particularly suitable for use in fastener tightening tools. The differential transformer transducer in FIG. 1 is also physically small enough to be advantageously used in the drive line of an otherwise conventional fastener tightening tool without enlarging the normal tool envelope.

Referring to FIG. 2 a schematic block diagram of the control system is shown which utilizes the signal produced by the transducer illustrated in FIG. 1. The circuitry for a single tool is shown although the circuits may be duplicated for multiple tool arrangements. The system preferably uses a precision regulated direct current or DC low voltage power supply 70 which is coupled to an unregulated low voltage DC power supply 72 through a pressure switch 74 for operating the power supply 72 to turn on. The power supply 70 is also coupled to a torque detector circuit represented by the block 76. The torque detector 76 uses power from the supply 70 to furnish a carrier alternating current or AC voltage to the transducer mounted in the tool 10. The torque detector 76 is also operable to receive electrical signals from the transducer for electrical amplification and conditioning. The amplified and conditioned signal from the transducer, via the torque detector circuit, is supplied to a settable shutoff trigger switch 78 having a signal magnitude triggering adjustment 79. The trigger switch 78 is operable in response to receiving a predetermined signal magnitude from the torque detector to couple the power supply 70 to a solenoid-actuating switch 80. The switch 80 in response to receiving an electrical signal operates to couple the power supply 72 to the solenoid operator of the valve 26 and to provide an electrical signal to switch 82. The solenoid valve 26, previously described, is a two-position valve having an *a* and *b* position.

The switch 82 is normally closed and upon operation of switch 80 receives a signal therefrom and transmits the same to an indicator comprising a green light 84. The signal via the switch 82 is also recorded by recording means represented by the block 86. The recorder may be one of a number of well-known recording devices which are operable to record an electric signal electrically, graphically, or by means of a printed or perforated document.

The signal output from the torque detector 76 is also coupled to a settable overtorque trigger switch 88 having a signal magnitude triggering adjustment 90. The trigger 88 is preset to couple the power supply 70 to a second indicator comprising a red light 92 in response to receiving a signal magnitude greater than the signal magnitude required to actuate the shutoff trigger 78. The output signal from the overtorque trigger is also operable to open the green light switch 82 and to be recorded by the recorder means 86. An operator reset switch 94 is interposed between the power supply 70 and the overtorque trigger 88 for opening the circuit therebetween and turning off the indicator 92. The complete torque control system also includes a two-position operator control valve 96 operable to be in position *b* blocking the flow of compressed air from the supply, not shown, to the solenoid shutoff valve 26 and venting the conduit 24. In response to the operator actuation of the valve 96 to position *a* pressure air is supplied to the valve 26.

An operating cycle of the system illustrated in FIG. 2 to tighten a threaded fastener would be initiated by operation of the valve 96 to the position *a* supplying compressed air through valve 26, in position *b*, to the tool 10. Pressure air from conduit 24 would also close pressure switch 74 providing a signal from power supply 70 to turn on power supply 72 As the tool operates to tighten a threaded fastener the torsional motive force transmitted by the drive elements 50 (FIG. 1) would produce a proportional electrical signal to be amplified by the torque detector circuit 76. As the signal from the torque detector to the shutoff trigger 78 reached the preset value corresponding to the predetermined maximum torque to be exerted on the fastener the switch 80 would be actuated by a signal from the shutoff trigger 78. The switch 80 accordingly would supply power from power supply 72 to the solenoid actuator of valve 26 moving the same to position *a*. In position *a* the valve 26 would shut off the supply of pressure air to the tool and vent the motor inlet passage 98. Rapid venting of the motor inlet passage is important to prevent any overtorquing resulting from residual pressure air trapped between the valve 26 and the motor inlet. Actuation of the switch 80 also provides a signal through the green indicator switch 82 to turn on the green light indicator 84 and record the completion of a satisfactory operating cycle on the recorder 86. Upon indication of a satisfactory operation the operator would release the operating lever of valve 96 allowing same to move to the position b blocking the supply of pressure air to conduit 24 and venting same. Venting of conduit 24 would result in opening of pressure switch 74 turning off power supply 72 and the return of valve 26 to position b. The trigger 78 and switch 80, no longer receiving signals, accordingly would reset for another operating cycle.

If the torsional motive force transmitted by the transducer failed to produce a proportional signal of sufficient magnitude to operate the trigger 78, due to insufficient motive air pressure or a stripped thread in the fastener, the trigger 78 would not signal the switch 80 to close. Accordingly, a green or satisfactory cycle indication would not be observed by the operator or recorded by the recording means 86.

The control system of FIG. 2 also provides for signalling overtorquing of a fastener by the tool 10. If the tool should fail to be shut off at the predetermined torque level corresponding to the setting of the trigger 78 a proportionally greater signal magnitude would be sensed by the overtorque trigger 88 and at a predetermined signal strength the trigger 88 would couple the power supply 70 to the red indicator 92 and the recorder 86 thereby indicating and recording an overtorqued fastener. The signal from the overtorque trigger 88 would also operate the green indicator switch 82 to open preventing an indication of a satisfactory cycle by the indicator 84.

The overtorque trigger 88 also operates to maintain a closed circuit to the indicator 92 until the circuit is opened by the reset switch 94.

As may be appreciated from the foregoing, the control system of the present invention operates to control with precision the maximum torque exerted on a threaded fastener by a power tool. Although the disclosure is directed to a single or multiple spindle tool for tightening threaded fasteners, the present invention contemplates that the system disclosed could be modified to control the torque developed by single and multiple spindle drilling machines or similar apparatus. Furthermore, the circuit elements represented by the block diagram of FIG. 2 are well known in the art of electrical engineering and could be modified to perform various control functions.

The present invention also contemplates that the differential transformer transducer comprising the members 50 and 64 in FIG. 1 could be replaced by other forms of electromechanical transducers which are operable to produce an electrical signal proportional to a mechanical displacement. For example, various elements utilizing well-known strain gage operating principles or devices using changes in magnetic permeability of materials under stress could conceivably be utilized as a signal producing means. Such devices in order to enjoy the benefits of the present invention would require to be designed as a component of the drive train of the tool as disclosed in FIG. 1.

What I claim is:
1. A control system for a torque producing tool, said tool comprising:
   motor means operable to produce a torsional motive force;
   drive means operable to be driven by said motor means to transmit said torsional motive force to a workpiece;
   supply means operable to be in communication with said motor means for delivering motive energy to operate said motor means;
   means operable to shut off said supply of motive energy to said motor means;
   said control system comprising;
   signal producing means interposed in said drive means between said motor means and said workpiece operable to produce an electrical signal proportional to the torsional motive force imposed on said drive means by said motor means; and,
   control means including a control circuit operable to receive said electrical signal from said signal producing means and in response to a predetermined electrical signal magnitude actuate said shutoff means to shut off the supply of motive energy to said motor means.
2. The invention set forth in claim 1 wherein:
   said control circuit is operable in response to receiving a first predetermined signal magnitude to actuate said shutoff means to shut off the supply of motive energy to said motor means and said control circuit includes first indicator means operable to indicate the actuation of said shutoff means.
3. The invention set forth in claim 2 wherein:
   said control circuit includes second indicator means operable in response to a second predetermined signal magnitude to indicate a torsional motive force exceeding the torsional motive force producing said first signal magnitude.
4. The invention set forth in claim 1 together with:
   recording means operable to record the magnitude of said electrical signal produced by said signal producing means.
5. The invention set forth in claim 1 wherein:
   said signal producing means comprises an element of said drive means between said motor means and said workpieces.
6. The invention set forth in claim 5 wherein:
   said signal producing means comprises the drive element of said tool which is engaged with said workpiece.
7. The invention set forth in claim 1 wherein:
   said signal producing means comprises an electromechanical transducer operable in response to a torsional motive force imposed on said drive means to produce an electrical signal having a magnitude proportional to said force.
8. The invention as set forth in claim 7 wherein:
   said electromechanical transducer comprises a differential transformer.
9. The invention as set forth in claim 1 wherein:
   said motor means is pressure fluid operated and includes a motor inlet passage, said energy supply means comprises a source of pressure fluid, said shutoff means comprises valve means interposed between said motor means and said supply means and operable in response to a predetermined electrical signal from said control means to shut off said supply of pressure fluid to said motor means and vent said motor inlet passage.